H. H. FELLOWS.
FOOD MIXER.
APPLICATION FILED AUG. 26, 1911.
1,026,259.
Patented May 14, 1912.
2 SHEETS—SHEET 1.
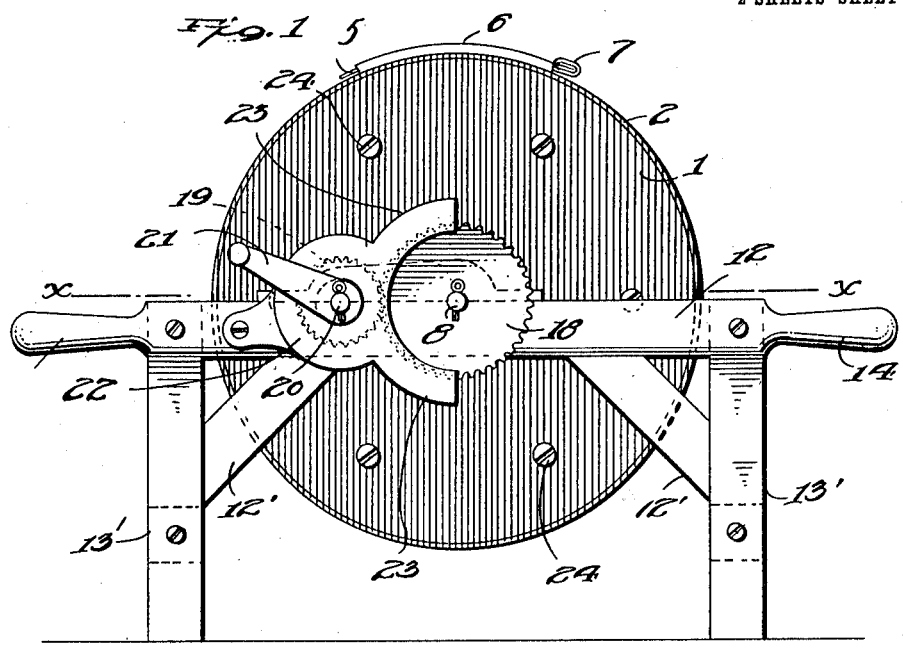
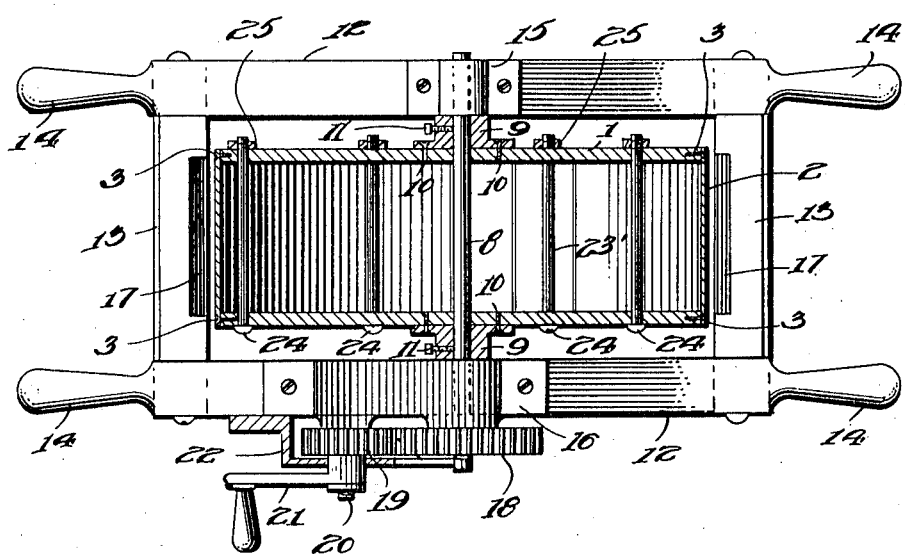
WITNESSES
INVENTOR
Harry H. Fellows
By E. E. Trooman, Attorney.

H. H. FELLOWS.
FOOD MIXER.
APPLICATION FILED AUG. 26, 1911.
1,026,259.
Patented May 14, 1912.
2 SHEETS—SHEET 2.
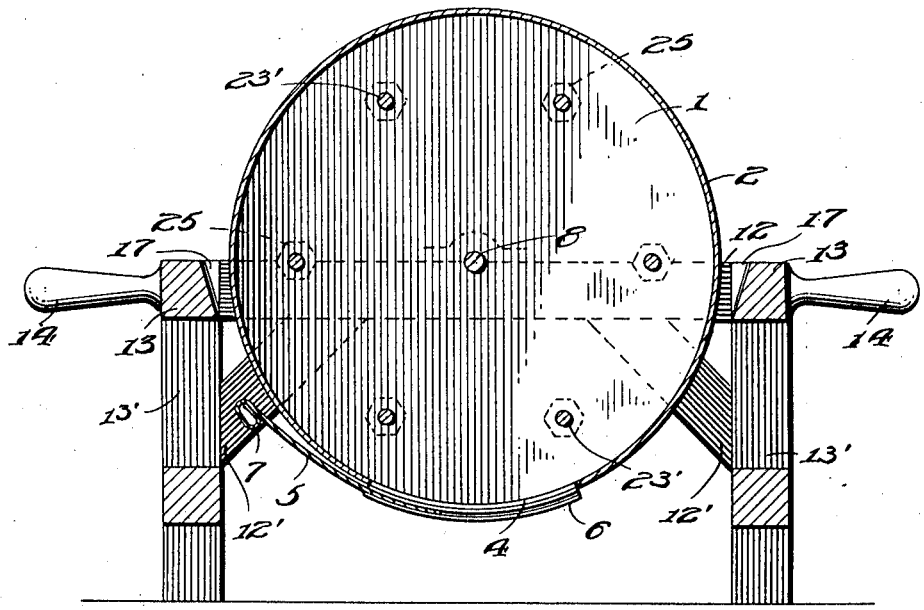
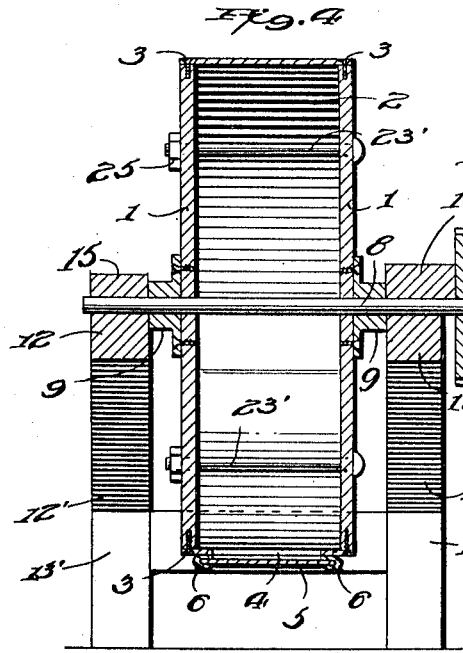
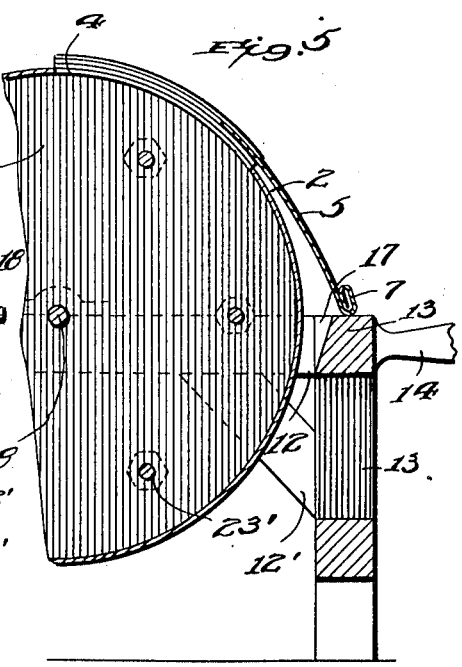
WITNESSES
J. H. Mile
E. W. Cady
INVENTOR
Harry H. Fellows
By E. E. Crosman, Attorney.

UNITED STATES PATENT OFFICE.

HARRY H. FELLOWS, OF MACLEAY, OREGON.

FOOD-MIXER.

1,026,259. Specification of Letters Patent. Patented May 14, 1912.

Application filed August 26, 1911. Serial No. 646,144.

*To all whom it may concern:*

Be it known that I, HARRY H. FELLOWS, a citizen of the United States, residing at Macleay, in the county of Marion and State of Oregon, have invented certain new and useful Improvements in Food-Mixers, of which the following is a specification, reference being had therein to the accompanying drawing.

This invention relates to machines for mixing food for live stock, and has especial reference to machines for mixing food for poultry.

The invention has for its object to provide an improved machine for mixing food for poultry by means of which the food will be thoroughly mixed.

The invention further has for its object to provide an improved machine for mixing food for poultry, by means of which the machine may be readily supplied with the materials for mixing.

Referring to the accompanying drawings:—Figure 1 is a side view of a machine for mixing food for poultry, constructed in accordance with this invention. Fig. 2 is a plan view thereof, in horizontal section on the line $x$—$x$ of Fig. 1. Fig. 3 is a side view of the machine in vertical section showing it in position for discharging the mixed food. Fig. 4 is an end view in vertical section of the machine. Fig. 5 is a detail view in vertical section showing a portion of the machine in position for being filled with the materials to be mixed.

In the construction of the invention a drum is provided which may be made of wood or metal and as here shown is preferably constructed with the wooden sides 1 and with the peripheral portion 2 preferably of sheet metal which is secured to the sides 1 by screws 3. The peripheral portion 2 is provided with an oblong opening 4 through which the materials to be mixed are passed, said opening 4 being closed by means of a door 5 formed of a strip of flexible sheet metal which is slidable in guides 6 and has a suitable handle, as for example the rolled end 7. The drum is mounted on a shaft 8 which extends through the drum and through flanged blocks 9 secured to the sides of the drum by means of screws 10, the shaft being held rigidly in place by means of a set screw 11 passing into one of the blocks 9 and bearing against the shaft 8. The shaft 8 is mounted on a suitable frame and as here shown consists of the longitudinal side bars 12 and the cross end bars 13 secured to the side bars, the ends of the side bars 12 being provided with suitable handles 14 for carrying the machine from place to place. The shaft 8 has one end inclosed in a bearing plate 15 on one side of the plate and in a bearing plate 16 on the other side of the plate. The end cross bars 13 of the frame are each provided with a recess 17 to permit the passage of the handle 7 of the cover as the drum rotates.

The drum is revoluble by means of suitable mechanism, as for example, by means of the large toothed gear wheel 18 mounted on one end of the shaft 8 and meshing with a smaller toothed wheel 19 mounted on a shaft 20 projecting from the frame beneath the plate 16. The wheels 18 and 19 are operated by means of a crank handle 21, or any suitable power if desired, the toothed wheel 19 being inclosed in the casing 22 secured to the side of the frame and formed with curved extensions 23 which partly inclose the toothed wheel 18, thereby protecting the gear wheels at their joint or junction against dirt and other matter which would clog the same. The frame is braced by means of inclined brace bars 12' connecting the side bars 12 with the legs 13' located at the corners of the frame.

The machine is employed as follows:—
The drum being in the position shown in Fig. 1 the door 5 is opened and the drum is slightly rotated until the extended end of the cover 5 is brought to bear against one of the end cross bars 13 as shown in Fig. 5. The cover 5 being formed with a slightly different curve from the periphery of the drum and being flexible serves when in the position shown in Fig. 5 to hold the drum in place against rotation while it is being filled through the opening 4 with the materials to be mixed. The drum being half filled with the materials to be mixed the door 5 is closed and the drum is revolved for several minutes, which causes the materials therein to be tossed about and by means of the rods 23 to be thoroughly mixed. The drum is then brought to a stop in the position shown in Fig. 3, with the opening 4 at the lower side of the drum and the door 5 is then opened and the mixed food emptied into a suitable receptacle.

Having thus described the invention, what is claimed, is:

1. In a food mixing machine of the kind described, a frame, a revoluble drum mounted in said frame, and having a door opening in its periphery, and a resilient slidable door mounted over said opening and formed with a curve eccentric to the periphery of the drum.

2. In a food mixing machine of the kind described, a frame, a revoluble drum mounted in said frame, having a door opening in its periphery, and a door slidable over said opening and formed of flexible resilient material curved longitudinally and eccentric to the periphery of the drum.

3. In a food mixing machine of the kind described a frame having a cross bar at each end, a drum revolubly mounted in said frame and having a door opening in its periphery, and a flexible resilient metallic door slidably mounted over said opening and having a handle at one end, said door being curved eccentrically to the periphery of the drum and adapted to rest at its handle end upon an end cross bar of the frame.

4. A machine for mixing food for poultry comprising a frame, a revoluble drum having a plurality of rods located therein adjacent to the periphery of the drum, and a door opening in its periphery, a flexible resilient curved slidable door mounted over said opening and movable away from said opening at a tangent to the periphery of the drum, a shaft secured to said drum and mounted on said frame, a driving gear mechanism connected with said shaft and a casing partly inclosing said gear mechanism.

In testimony whereof I hereunto affix my signature in presence of two witnesses.

HARRY H. FELLOWS.

Witnesses:
WALTER G. DUNGAY,
F. E. GOODELL.

---

Copies of this patent may be obtained for five cents each, by addressing the "Commissioner of Patents, Washington, D. C."